United States Patent [19]

Strickler

[11] 4,294,647

[45] Oct. 13, 1981

[54] WOOD FINGER JOINTING APPARATUS

[76] Inventor: Melvin D. Strickler, 192 Larch La., Columbia Falls, Mont. 59912

[21] Appl. No.: 151,714

[22] Filed: May 20, 1980

[51] Int. Cl.[3] .......................... B27F 1/16; B32B 31/20

[52] U.S. Cl. .................................. 156/558; 144/3 R; 144/91; 144/253 C; 144/317; 156/512; 156/535; 156/559; 156/583.1

[58] Field of Search ............... 156/558, 559, 556, 258, 156/266, 304.5, 535, 583.1, 555, 512; 144/3 R, 3 E, 91, 3 D, 242 C, 242 E, 253 C, 309 L, 317

[56] References Cited

U.S. PATENT DOCUMENTS

| | | | |
|---|---|---|---|
| 2,537,918 | 1/1951 | Skoog | 156/558 |
| 3,126,308 | 3/1964 | Brockerman et al. | 144/317 |
| 3,388,020 | 6/1968 | Gates | 156/558 |
| 3,927,705 | 12/1975 | Cromeens et al. | 156/258 |
| 3,942,233 | 3/1976 | Cromeens | 156/558 |
| 4,128,119 | 12/1978 | Maier | 156/258 |

*Primary Examiner*—Michael G. Wityshyn
*Attorney, Agent, or Firm*—Wells, St. John & Roberts

[57] ABSTRACT

Apparatus is described for continuously producing finger jointed lumber from individual elongated boards. Each board includes opposed end faces with elongated parallel fingers that will mate with complementary fingers of a following board to form end-jointed lumber. A reciprocating ram engages one end of successive individual boards, pushing the board longitudinally along a path to a confining box. The ram retracts to engage a successive board along its end face to push it longitudinally into engagement with the board held by the confining box. The fingers of the engaging board ends mate within the confining box and are pressed together to complete a joint. The ram includes a ram face that is complementary to the finger configuration of the board ends to mate intimately with the board end. The ram face may be heated to apply heat to the successive board ends for glue curing purposes. The successively engaged boards are pressed firmly together to complete the joint by operation of the ram or by auxiliary moving clamp assemblies along the framework of the apparatus.

7 Claims, 5 Drawing Figures

WOOD FINGER JOINTING APPARATUS

BACKGROUND OF THE INVENTION

The present invention is related to apparatus for end joining successive board lengths to form a single elongated piece of lumber, and more particularly to such devices for end joining individual boards having parallel fingers cut or pressed into abutting opposed transverse ends thereof.

There are two basic forms of apparatus used for end gluing and finger jointing short pieces of wood in end-to-end relationships to make long length lumber. The first is distinguished by a "stop and go" assembly procedure, while the second makes use of a continuous assembly.

"Stop and go" assembly may involve apparatus for aligning short pieces of wood spaced several inches apart from one another. Adjacent pieces of wood are then held in rigid clamps during the machining of a fingered configuration in the opposing ends by use of tapered saws or cutter heads. The ends can also be formed by pressing them on a die. The fingered configurations of the ends are then coated with an adhesive and clamped. The adjacent pieces are subsequently moved (by moving one or both of the clamps) toward each other to mate or close the joint. Sufficient pressure is applied during the jointing step to obtain a good glue bond at the mating surfaces of the fingers. Alternatively, the finger configurations are first brought together and then clamped only during the curing time of the adhesive.

The main disadvantage with "stop and go" end gluing is that a considerable amount of time is required before the adhesive within the joint will cure sufficiently. Because the wood is basically stationary during the clamping time, "stop and go" assembly is necessarily characterized by unacceptably low volume production.

On the other hand, a primary advantage with the clamping "stop and go" method is that the wood pieces can be held in perfect alignment during machining and mating. Misalignment of the joint can usually be prevented, even if the wood is warped, bowed, cupped, twisted, or otherwise moderately crooked. The product is therefore straight, since offsets at the joint or other misalignment problems rarely occur. Another advantage of the "stop and go" apparatus is that very small, short fingers can be used in the joint due to the accurate control maintained during the joint mating step.

Apparatus for continuously assembling finger joints produces a continuous flow of wood pieces through various types of conveyors during the mating, end pressing and glue curing steps. The conveyors mate the end finger configurations of longitudinally moving pieces and then apply end pressure necessary for glue bonding by varying the speed and longitudinal movement of successive boards along the operating conveying surfaces. Cure of the adhesive is usually accomplished by continuing to move the newly mated joints through a radio frequency field. With such procedures, the machining of fingers and application of glue to the end surfaces precedes the mating step and is accomplished by unrelated machinery.

The main advantage demonstrated by continuous flow finger jointing apparatus is high speed, high volume production. However, the desirable features of accurate alignment and capability of operating with short fingers exhibited by the "stop and go" apparatus is sacrificed. Warp of any kind in the wood tends to cause misalignment of the joint. Offset at the joint, whether it be horizontal or vertical, frequently results in a joint being mismatched by one finger, crossover of a finger from one groove to another, or two fingers entering one groove. The result is a weak or defective joint.

The difficulty encountered in accurately mating finger joints by use of a continuous assembly apparatus is partially overcome by using joint designs that make use of relatively long fingers and wide finger "pitch" (the distance from one finger tip to the tip of an adjacent finger). The greater pitch creates a wider gap into which a mating finger tip can enter. However, long, wide pitch fingers are a disadvantage in that they waste valuable wood product removed by machining. Long fingers also tend to split more readily when high gluing end pressure is applied.

Another disadvantage encountered with continuous flow apparatus is that pressure is not applied in a direction perpendicular to the outermost fingers. The wedging action of the mating "V" shaped fingers tends to prevent good contact of the outer fingers as the glue cures. The result is frequent poor glue bonds between the outermost fingers and their mating surfaces. Poor glue joints between long finger joint designs represent a significant portion of the cross section of the finger jointed member and therefore substantially weaken the resulting board at the glue joint, particularly in the zone of highest bending stress concentration. If the outermost fingers are not properly bonded, especially in long joint designs, the result is a weak, non-structural end joint that cannot qualify for use as higher grades of structural lumber.

The present invention overcomes the main disadvantages of both types of existing apparatus for assembling finger jointed lumber. The apparatus disclosed herein makes use of a semicontinuous flow, combining advantages of precise joint mating and high volume production. It accepts boards for bonding in a system in which the machining of fingers and the application of glue have previously been carried out by conventional means.

DETAILED DESCRIPTION OF PREFERRED AND ALTERNATE EMBODIMENTS

Figure 1:
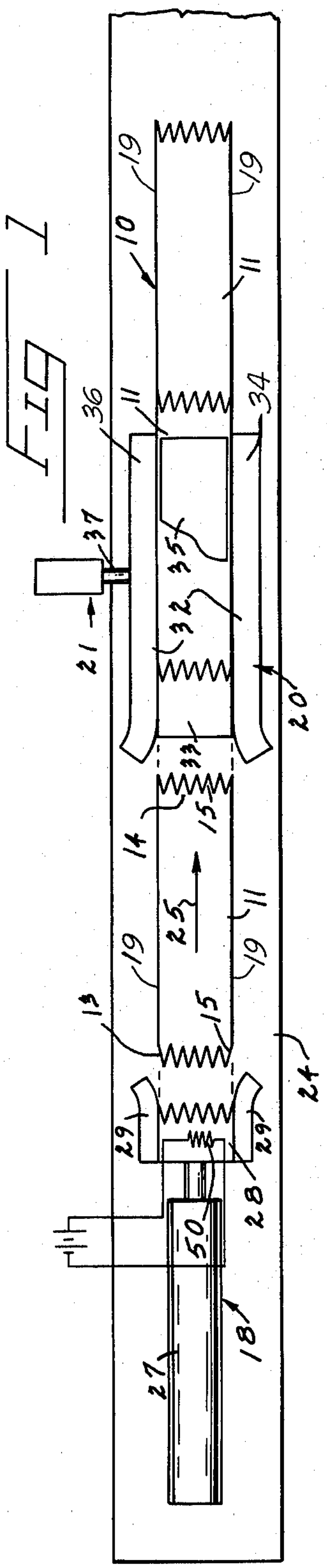
FIG. 1 is a schematic view of a first embodiment of the present invention.

The present invention produces an elongated continuous strip of lumber 10 from a plurality of individual boards 11 joined end-to-end. The boards 11 each include opposed transverse ends including first ends 13 and opposed second ends 14. The ends 13 and 14 of each board 11 present complementary finger configurations 15 comprised of a number of parallel longitudinally projecting fingers. The fingers are parallel to opposed side edges 19 of the boards and are formed in the board end surfaces prior to being received by the present apparatus for end joining purposes. The finger configurations can vary somewhat as long as the boards can be joined end-to-end with a longitudinal translational movement. Preferably, however, short die pressed fingers are used for better overall strength characteristics in the finished lumber.

The present apparatus is shown primarily in schematic form in the accompanying drawings, it being understood that various forms of conventional mechanism and drive devices can be used to accomplish the functions set forth below.

The present apparatus includes three basic components. A ram means 18 is provided for engaging successive boards along first ends 13 thereof. The ram means 18 moves the boards in a prescribed longitudinal path parallel to their lengths through a prescribed distance relative to a receiving channel means 20. The channel means 20 engages successive boards as they are shifted by the ram means 18. It aligns the first end 13 of each board with the second end 14 of a succeeding board to be received and moved along the path by the ram means 18. The third basic element is a thrust means 21 situated in relation to the ram and channel means for forceably moving the mated first and second ends of successive boards together.

Figure 2:
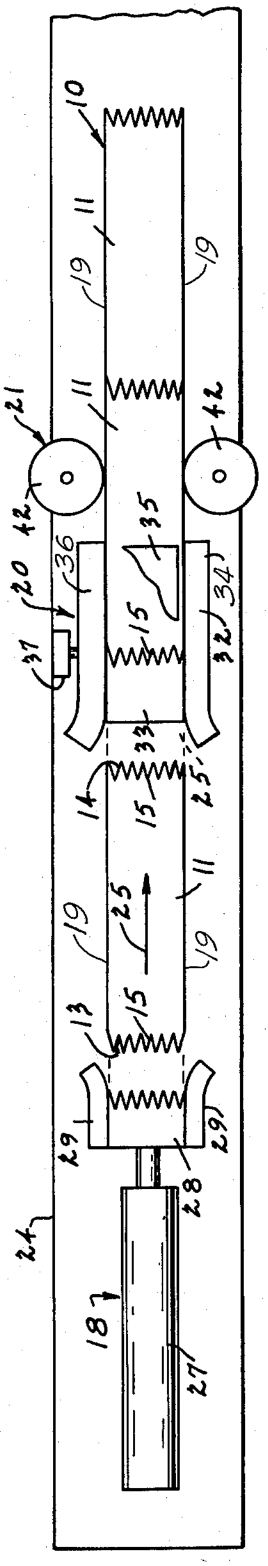
FIG. 2 is a schematic view of a alternate embodiment.
Figure 3:
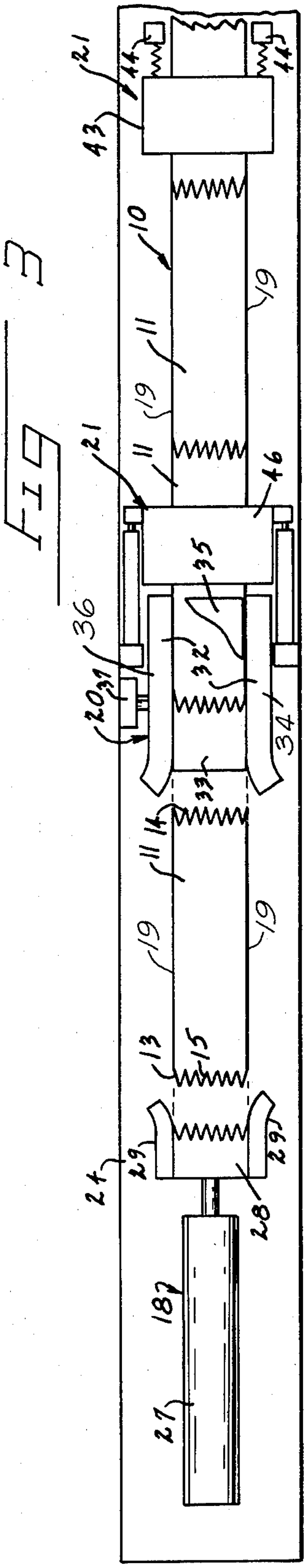
FIG. 3 is a schematic view of another alternate embodiment of the invention.

A basic embodiment of the present invention is illustrated in FIG. 1. Alternate forms are shown in FIGs. 2 and 3.

All embodiments include an elongated framework 24. Framework 24 extends parallel to the intended path of the formed lumber 10. The frame 24 defines a longitudinal path 25 along which the boards 11 are moved.

A ram 18 is positioned at one end of the framework 24 for intermittently engaging the first ends 13 of successive boards 11. It is movable along the path in a first direction indicated by arrow 25 and in an opposite second direction for providing clearance for incoming boards. The boards can be directed to the ram 18 from any conventional hopper arrangement (not shown) or can be hand fed into the apparatus.

The ram 18 includes a ram head 28 mounted to the piston of a cylinder assembly 27. The ram head 28 includes a face configuration that is complementary to the fingered end 13 of the individual boards. The ram head 28 prevents damage to the fragile fingers.

The stroke of ram 18 is preferably slightly longer than the maximum length of a board 11. This assures that the reciprocating path of the ram head 28 will not interfere with reception of successive boards 11 between the ram head 28 and channel means 20. This stroke length, as will be seen in an alternate form, can be varied to include lengths somewhat shorter than the maximum board length.

Figure 4:
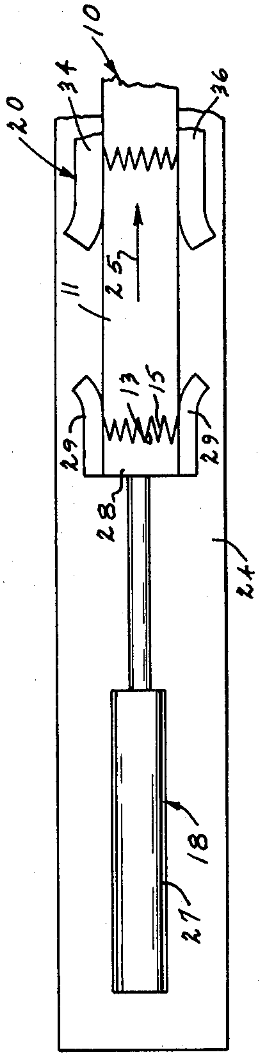
FIG. 4 is a diagrammatic detail view showing joining of two boards by the present apparatus.

The cylinder 27 reciprocates the ram head 28 along the longitudinal path 25 from the retracted positions shown in FIGS. 1, 2 and 3 to the operative position shown in FIG. 4. The speed of the stroke can vary, thereby affecting the overall production rate of the entire apparatus.

One form or another of a guide means is provided on the frame for the purpose of holding the successive boards along the longitudinal path 25 as they pass through the channel means 20 and thrust means 21. The guide means can be provided in the form of longitudinal shoes or guide rods (not shown) set at stationary transverse positions along the frame. Such rods would simply engage the opposed side edges of the boards and direct successive boards moved by operation of the ram through the apparatus along the path 25.

Preferably, however, the guide means is provided as an integral part of the ram 18 and channel means 20. Longitudinal spread guide surfaces, such as the side guides 29 and similar surfaces on the channel means 20 can be provided to guide the boards along the path 25.

The channel means 20, as briefly discussed above, is provided along the path and associated with the guide means to longitudinally receive successive boards as they are moved by the ram 18.

Figure 5:
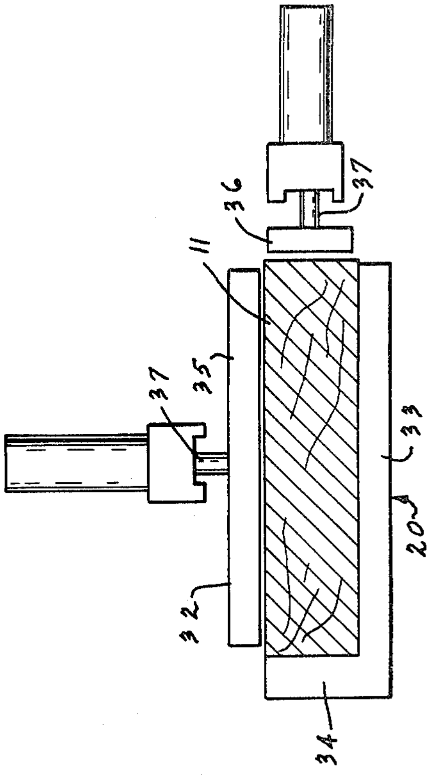
FIG. 5 is a transverse cross-sectional view showing details of a confining box used with the present apparatus.

The channel means 20 is preferably comprised of a confining box 32 (FIG. 5) mounted to the framework 24 to transversely engage each board passing through it by operation of ram 18. A base section 33 is shown in FIG. 5 having an integral upright leg 34. Two opposed sides, a top side 35 and a side edge 36 complete the open ended box with the base section 33. The sides 36 and 35 are backed by cylinders 37 or some other functionally equivalent device which can retract a small amount under pressure to accommodate minor variations in the dimensions of the wood boards 11. The sides 35 and 36 press the wood firmly against the leg 34 and base section 33. The box 32 is long enough and the fit of the boards within the box is tight enough to assure accurate alignment of the adjacent ends 13 and 14 at the instant of mating the joint.

In FIG. 1, the box 32 is shown as being substantially more elongated than the channel means shown in FIGS. 2 and 3. In FIG. 1, however, the channel means 20 and guide means have been combined by extending the side edges 36 and upright leg 34.

Several forms of the thrust means 21 are shown in the drawings. Basically, however, the thrust means 21 is provided to retard movement of the joined boards along the path 25 to thereby forceably urge the mated ends of successive boards longitudinally together.

In FIG. 1, the thrusting means 21 is included as an integral element along with the channel means 20. These cylinders 37 (or equivalent devices) can be operated to move side edge 36 toward the leg 34, frictionally clamping a board between them. This clamping action transverse to the boards resists sliding movement of the board along the longitudinal path as imparted by the ram 18. Therefore, the ram 18, together with the box 32, provides sufficient compressive force along the lengths of the successively joined boards to compress the finger joints and complete proper bonding of the interengaged fingers.

FIG. 2 illustrates an alternate form of the thrusting means 21, including a pair of retarding rolls 42. The rolls 42 are used in conjunction with the ram 18 to compress boards endwise. They produce sufficient longitudinal compressive forces to assure bonding of each joint. Here, as in the FIG. 1 embodiment, the ram 18 is used to produce the end pressure, while the rolls 42 are situated downstream of the confining box 32 to engage the boards and offer resistance to longitudinal movement of the boards along the path 25.

An alternative to developing high end pressure with the ram means 18 is a press assembly as shown in FIG. 3. The press assembly includes a first clamp 43 spaced downstream along the path 25 from the confining box 32. It successively clamps and releases the boards passing within it. The clamp 43 may be held stationary and operates directly against forces produced by a movable clamp 46 spaced between clamp 43 and the box 32.

The movable clamp 46 functions to alternately grip and release boards within it and intermittently moves longitudinally toward clamp 43. This produces compressive forces along the length of the engaged boards between the two actuated clamps. The press assembly operates as the ram 18 is retracted to receive the next board.

In the event the ram stroke may be somewhat less in length than the longest board, the ram will not push the trailing first end 13 of a board into the confines of box 32. In this event, the press assembly would also be used to advance the joined wood member so that the trailing first end could be positioned in the middle of the confining box before end pressure is exerted on the previously mated joint. To this end, the entire press assembly will move longitudinally, carrying the wood with it until clamp 43 moves into engagement with a fixed abutment 44. The movable clamp 46 then applies the necessary end pressure momentarily against the clamp 43 and abutments 44. Both clamps 43 and 46 then release the wood and return to their initial starting positions while the ram 28 drives the next board forwardly.

The basic purpose of the ram and movable press arrangement is to situate the successive first ends 13 of the boards within the confining box 32 prior to being joined with the incoming end of the next successive board. The confining box serves to rigidly hold the end 13 of the first board at a point near the midpoint of the box. The opposing or mating end 14 of the second board is thrust into the open end of the box so that the ends of the two pieces will meet and the joint is then mated inside the confining box. With proper machining of the joint ends the confining action of the box assures the desired alignment of the two pieces of wood and the entrance of each finger into the proper mating groove, even if one or both pieces of wood being joined contain a fair amount of warp. Additionally, small, short fingers can readily be employed with this apparatus.

In practice, the first end 13 of one board is positioned in the confining box 32 by the operation of ram 18. The ram then retracts to receive a second board. This board is placed in general alignment with the first board near the open end of the box 32. The ram 18 is then actuated to push against the first end 13 of the second board, thrusting it into the confining box 32 until its end 15 mates with the end 13 of the first board. This forward motion pushes the second board through the confining box (along with the mated first board) and brings the first end 13 of the second board into the confining box or adjacent thereto. In the FIGS. 1 and 2 embodiments, the ram must operate to push the second board end 13 directly into the confining box. In the FIG. 3 embodiment, the first ends 13 are drawn into the confining box by the press mechanism.

In the first, preferred forms of the invention, the ram will deposit the end 13 of the second board in the middle of the confining box. To do this, two or more sections of the box will retract before the ram reaches the end of its travel to prevent mechanical inteference. As an additional alternative, only the thrusting face surface of the ram might penetrate into the middle of the confining box, with the side guides 29 remaining at the box opening and sliding over a guide surface (not shown).

The ram is retracted rapidly following its full extension to allow the next piece of wood to be positioned for joining to the second board, and so on. The speed of operation depends upon the speed of the ram reciprocating between its extreme positions and the speed with which a board can be introduced into the assembly apparatus with the ram fully retracted. I have found these speeds can be sufficient to provide high speed, high volume production.

Production can be increased by heating the ram head face 28. This can be done with a resistance type heater 50 as shown in FIG. 1. Of course, other forms of heat applying apparatus can be used to initially heat the finger engaging surfaces of the ram head 28. The heated head of the ram warms the fingers of the mating board ends 13 and consequently increases the rate of cure when a thermo-setting adhesive is used to complete the glue joint.

The above description and attached drawings are given by way of example to set forth a preferred and alternate forms of the invention. However, the scope of the invention is more precisely defined in the following claims.

What I claim is:

1. Apparatus for end joining straight elongated boards having a preselected maximum length and a common transverse cross section, the boards having complementary configurations of elongated parallel fingers formed between opposed side edges of the boards across opposed first and second transverse end faces thereof, comprising:

an elongated frame;

guide means on the frame for engaging the opposed side edges of the boards and directing the boards along a straight path parallel to the board lengths;

ram means movably mounted on said frame at a location adjacent the guide means at one end of the path for reciprocating movement along the path in a first direction for engaging successive boards across their first end faces and for imparting movement to the boards along the path their second end faces into mating engagement with the first end faces of preceeding boards and in an opposite second direction for providing clearance for engagement of incoming boards by said guide means;

said ram means having a ram face for engaging the first end faces of the boards, said ram face having a configuration matching the finger configuration of the first board ends;

channel means on said frame positioned transversely adjacent to the path for receiving successive boards moved along the path by the ram means and for transversely engaging the opposed edges of the board to align the first end of each board with the second end of a preceding board at the instant of mating the joint between them; and thrusting means on the frame for clamping opposed side edges of the boards and forcibly resisting movement of the mated first and second ends of successive boards as imparted by said ram means.

2. The apparatus as defined by claim 1 further comprising heating means connected to the ram face for heating the ram face and first end faces of boards engaged thereby.

3. The apparatus as defined by claim 1 wherein the channel means includes a transverse confining box on the frame in the path of the successive boards for engaging and precisely aligning the first end face of a first received board and the second end face of a second received board at the instant of mating the joint between them.

4. The apparatus as defined by claim 1 wherein the guide means includes longitudinal guide surfaces located between the ram means and channel means for slidably directing successive boards along the longitudinal path.

5. The apparatus as defined by claim 1 wherein the thrusting means is integral with the channel means, with the channel means including selectively operable clamp surfaces for transversely gripping opposed edges of successive boards to frictionally resist movement of the boards along the path as they are engaged at their respective first ends by subsequent boards having movement imparted to them along the path by operation of the ram means.

6. The apparatus as defined by claim 1 wherein the thrust means includes a pair of rolls mounted to the frame on opposite sides of the path for engaging opposed side edges of boards along the path to resist movement thereof as imparted by the ram means, thereby producing a compressive force along the length of mating boards engaged between the rolls and ram means.

7. The apparatus as defined by claim 1 wherein the thrust means includes:

a first clamp for gripping opposed side edges of boards and frictionally holding them along the path; and second clamp means located between the first clamp means and said ram means for gripping opposed side edges of boards along the path and urging them toward the first clamp means as the ram means is moving in said second direction.

* * * * *